United States Patent Office.

WILLIAM K. BOYLE, OF BROOKVILLE, MARYLAND.

Letters Patent No. 82,202, dated September 15, 1868; antedated September 7, 1868.

IMPROVEMENT IN THE MANUFACTURE OF ARTIFICIAL STONE.

*The Schedule referred to in these Letters Patent and making part of the same.*

TO ALL WHOM IT MAY CONCERN:

Be it known that I, WILLIAM K. BOYLE, of Brookville, county of Montgomery, and State of Maryland, have invented a new and useful Improvement in the Manufacture of Artificial Stone; and I do hereby declare the following to be a full, clear, and distinct description of the ingredients, and of the process for preparing and compounding the same.

My invention relates to the formation of artificial stone by the use of the soluble silicate of potash, in combination with sand, gravel, or any earthy material, for forming the mass or body of the stone, and subsequently submitting the mass thus formed to the action of a hot solution of the nitrate of lime, whereby, by virtue of the chemical affinities, the insoluble silicate of lime is produced, constituting the cementing property, the soluble nitrate of potash remaining in the bath in which the chemical change has taken place, which solution, by evaporation, can be utilized, forming, as it does, the nitrate of potash, or saltpetre.

Process.

Mix intimately with well-dried sand, gravel, clay, earth, or any insoluble substance, including minerals reduced to a finely-pulverized state, a sufficient quantity of the soluble silicate of potash, in the semi-fluid form, say 1,500 or 2,000 specific gravity, to form a plastic mass. The mixing of these ingredients may be by hand or appropriate machinery. As a general rule, the quantities should be about in proportion of one part of silicate of potash to six or eight parts of sand, clay, gravel, &c. A small quantity of fine hydrate of lime or common slaked lime, or any form of the carbonate of lime, may be mixed with the compound, that every crevice may be effectively filled. The mass is then pressed into moulds, of any form which may be desired, said moulds being made of plaster of Paris, wood, iron, or any other suitable material.

Then the mass, in the mould or moulds, is to be immersed in a hot or boiling solution of nitrate of lime, when a chemical interchange, by virtue of chemical affinities, takes place, the nitric acid of the soluble nitrate of lime having a greater affinity for the potash than for the lime, the insoluble silicate of lime forms the cementing property, while the soluble nitrate of potash is held in solution.

After this boiling is over, which may be continued until the chemical action has become perfect, which requires a longer or shorter period, according to the size of the mass, the stone still in the mould is to be immersed in boiling water until the nitrate of potash is dissolved, when it may be removed from the mould, and exposed to a gentle heat until dry, after which it is ready for use.

The boiling water, saturated with nitrate of potash, is then evaporated to dryness, and the residue will be found to be nitrate of potash, or saltpetre, having a considerable commercial value, by which the cost of manufacturing the stone is very much reduced.

In order to make the stone entirely impervious to water, the surface, after the boiling process is completed, may be washed with a solution of silicate of potash and the nitrate of lime, and again washed in water.

Stone thus formed will withstand the ordinary atmospheric tests, and will not be liable to injury from acids, having a hardness and durability, nearly if not quite equal to granite.

What I claim as my improvement and discovery, and desire to secure by Letters Patent, is—

The herein-described process of manufacturing artificial stone, by means of which the insoluble silicate of lime is formed, by the double decomposition of the silicate of potash and nitrate of lime, substantially as herein set forth and described.

And, as a secondary result, I claim the utilization of the nitrate of potash, as a waste material, in the manufacture of artificial stone, as herein set forth and described.

In testimony whereof, I have signed my name to this specification in the presence of two subscribing witnesses.

WM. K. BOYLE.

Witnesses:
JOHN D. BLOOR,
JOHN S. HOLLINGSHEAD.